(12) United States Patent
Taylor (10) Patent No.: US 10,108,925 B1
(45) Date of Patent: Oct. 23, 2018

(54) CHIP TRACKING WITH MARKING DATABASE

(71) Applicant: Xilinx, Inc., San Jose, CA (US)

(72) Inventor: Craig E. Taylor, San Jose, CA (US)

(73) Assignee: XILINX, INC., San Jose, CA (US)

( * ) Notice: Subject to any disclaimer, the term of this patent is extended or adjusted under 35 U.S.C. 154(b) by 309 days.

(21) Appl. No.: 15/204,924

(22) Filed: Jul. 7, 2016

(51) Int. Cl.
*B07C 5/344* (2006.01)
*G06Q 10/08* (2012.01)
*G06Q 30/00* (2012.01)
*G06F 21/31* (2013.01)

(52) U.S. Cl.
CPC .......... *G06Q 10/087* (2013.01); *G06F 21/31* (2013.01); *G06Q 30/0185* (2013.01)

(58) Field of Classification Search
CPC ........................................... B07C 5/344
USPC ......................................... 705/28
See application file for complete search history.

(56) References Cited

U.S. PATENT DOCUMENTS

| 6,359,248 | B1 | 3/2002 | Mardi |
| 6,373,011 | B1* | 4/2002 | Beffa ............... B07C 5/3412 209/571 |
| 6,674,036 | B1 | 1/2004 | Mardi |
| 6,984,533 | B1 | 1/2006 | Regos et al. |
| 2008/0230883 | A1* | 9/2008 | Yee .................. H01L 21/561 257/678 |

* cited by examiner

*Primary Examiner* — Russell S Glass
(74) *Attorney, Agent, or Firm* — Joshua Hamberger; Keith Taboada

(57) ABSTRACT

Techniques for improved semiconductor inventory tracking, control, and testing are provided. The techniques include marking the semiconductor packaging with a 2-dimensional ("2D") bar code that is stored in a data server. The data server associates the 2D barcode with performance data for the semiconductor, as well as with a "circuit-based identifier," which comprises hard-wired electrical features that uniquely identify the semiconductor and that are embedded within the semiconductor. Associating the 2D bar code with chip performance reduces the number of times that a chip needs to be tested. Associating the 2D bar code with the circuit-based identifier provides certain functionality such as anti-counterfeiting functionality, device verification, and the like.

20 Claims, 7 Drawing Sheets

| Semiconductor Data Storage 104 ||||
|---|---|---|
| Circuit-Based Identifier Data 109 | 2D Mark Code 110 | Circuit Package Data 114 |
| Identifier 1 | 2D Code 1 | Data 1 |
| Identifier 2 | 2D Code 2 | Data 2 |
| Identifier 3 | 2D Code 3 | Data 3 |
| ⋮ | ⋮ | ⋮ |

CHIP TRACKING WITH MARKING DATABASE

TECHNICAL FIELD

Examples of the present disclosure generally relate to electronic circuits and, in particular, to chip tracking with marking database.

BACKGROUND

Semiconductor device fabrication is a complex process that involves many manufacturing and testing steps. Typically, integrated circuits are etched onto wafers, which are then spot up yielding multiple dies. Due to variation in processing conditions, wafers and dies are tested at various stages in processing to determine performance characteristics. Testing may happen at various times, such as during wafer processing, after wafers have been split into dies, and at various other times.

SUMMARY

Techniques for tracking information for circuit packages are described. In an example, a method is provided. The method includes identifying a first circuit-based identifier value encoded into a first circuit package of the circuit packages. The method also includes identifying a first mark value for a first mark on a surface of the first circuit package. The method further includes associating the first circuit-based identifier value with the first mark value in a centralized data store to generate a first association. The method also includes receiving a request to obtain information for the first circuit package, the request including a second mark value. The method further includes comparing the second mark value to the first mark value to obtain the information for the first circuit package.

In another example, a registration system is provided. The registration system includes a storage device and a processor. The processor is configured to receive a first circuit-based identifier value encoded into a first circuit package of the circuit packages. The processor is also configured to receive a first mark value for a first mark on a surface of the first circuit package. The processor is further configured to associate the first circuit-based identifier value with the first mark value in the storage device to generate a first association. The processor is also configured to receive a request to obtain information for the first circuit package, the request including a second mark value. The processor is further configured to compare the second mark value to the first mark value to obtain the information for the first circuit package.

In another example, a circuit package is provided. The circuit package includes an integrated circuit die. The circuit package also includes a first circuit-based identifier located within the integrated circuit die and encoding a first circuit-based identifier value. The circuit package further includes an encapsulation material encapsulating the integrated circuit die. The circuit package also includes a first mark on a surface of the encapsulation material and encoding a first mark value. A centralized data store stores an association between the first circuit-based identifier value and the first mark value.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated embodiment need not have all the aspects or advantages shown. An aspect or an advantage described in conjunction with a particular embodiment is not necessarily limited to that embodiment and can be practiced in any other embodiments even if not so illustrated, or if not so explicitly described.

Techniques for improved semiconductor inventory tracking, control, and testing are provided. The techniques include marking the semiconductor packaging with a 2-dimensional ("2D") bar code that is stored in a data server. The data server associates the 2D barcode with performance data for the semiconductor, as well as with a "circuit-based identifier," which comprises hard-wired electrical features that uniquely identify the semiconductor and that are embedded within the semiconductor. Associating the 2D bar code with chip performance reduces the number of times that a chip needs to be tested. Associating the 2D bar code with the circuit-based identifier provides certain functionality such as anti-counterfeiting functionality, device verification, and the like.

Figure 1:
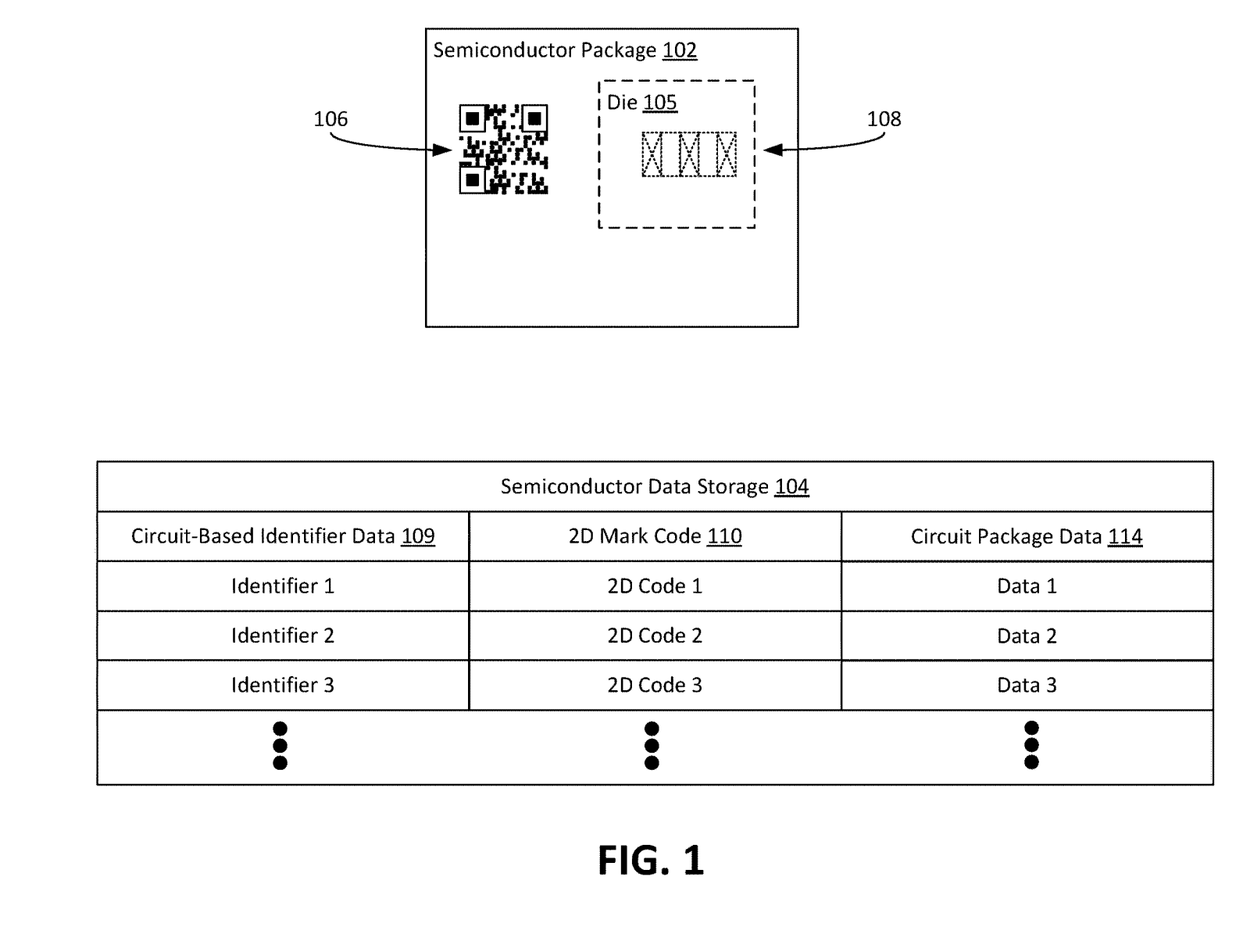
FIG. 1 is a diagram illustrating a semiconductor package and semiconductor data storage, according to an example.

FIG. 1 is a diagram illustrating a semiconductor package 102 and semiconductor data storage 104, according to an example. The semiconductor package 102 includes one or more dies fabricated according to known methods, and including other components for coupling to external circuitry, for encapsulating the dies, and for performing other functions as is generally known. A 2D mark 106 exists on the surface of the semiconductor package. The 2D mark 106 uniquely identifies the semiconductor package 102. A semiconductor data storage 104 stores 2D marks (or, more specifically, the values that are encoded to form the 2D mark, referred to as "2D mark codes 110"), and associates each 2D mark with a "circuit-based identifier" data 109 as well as with circuit package data 114. Circuit-based identifier data 109 is associated with a circuit-based identifier 108 located within the semiconductor package 102. Circuit-based identifier 108 comprises a set of hard-wired circuit features that together, store a value that uniquely identifies the semiconductor package 102. The circuit-based identifier 108 is readable from outside of the semiconductor package 102 by a probing device. In some embodiments, the circuit-based identifier 108 comprises a series of fuses that are either opened or closed in order to define a value in binary format. The circuit package data 114 includes performance data for the semiconductor package 102 associated with the circuit-based identifier data 109 and the 2D mark code 110.

In some embodiments, the value of the circuit-based identifier data 109 includes indications of one or more of the lot number of the wafer from which the die within semiconductor package 102 originated, the wafer number identifying the wafer from which the die within the semiconductor package 102 originated, and the coordinates of the die on that wafer. These numbers therefore uniquely identify the die within semiconductor package 102. In some embodiments, the 2D mark code 110 comprises a randomly generated number. In other embodiments, the 2D mark code 110 includes indications of one or more values that uniquely identify the semiconductor package 102 on which the 2D mark 106 is placed. In some embodiments, the 2D mark code 110 includes an indication of a location at which the semiconductor package 102 is marked with the 2D mark 106, an identification of the entity (e.g., corporation) that marked the semiconductor package 102 with the 2D mark 106, an indication of an assembly lot number, which indicates which set (or "lot") of semiconductor packages the marked semiconductor package is included in, an indication of the date on which the semiconductor package was marked, and a serial number for the semiconductor package, which uniquely identifies the semiconductor package at least for the vendor/site/lot combination. In some embodiments, the information included within the 2D mark 106 is encrypted so that the information cannot readily be gleaned by reading the 2D mark 106.

Semiconductor data storage 104 comprises centralized storage that stores the associations between the circuit-based identifier data 109, the 2D mark code 110, and the circuit package data 114. New entries (where each entry an association between one instance of circuit-based identifier data 109, one instance of a 2D mark code 110, and one instance of circuit package data 114) are stored in semiconductor data storage 104 when a semiconductor package 102 is assembled.

The circuit package data 114 comprises information about the performance of the die within the semiconductor package 102. This information can include speed binning data (e.g., a classification of the die into one of several speed classifications), the device's capability to operate and function per specification at extended temperature ranges, an customer specific additional information for advanced device performance capabilities that may extend beyond the published specification for the device. The fact that the device has a 2D mark allows for a single test procedure to obtain the testing data, which can be reviewed and provided to a customer at any time in the future, as well as for assignment of such devices based on order requirements.

The information stored in semiconductor data storage 104 provides several benefits. By storing circuit package data 114 and associating the circuit package data 114 with the 2D mark code 110, the number of times that testing to obtain performance data needs to occur can be reduced because after testing has been performed, the data obtained through testing can be obtained by simply reading the 2D mark 106 and then querying the semiconductor data storage 104 to obtain the circuit package data 114 that has already been stored.

Figure 2:
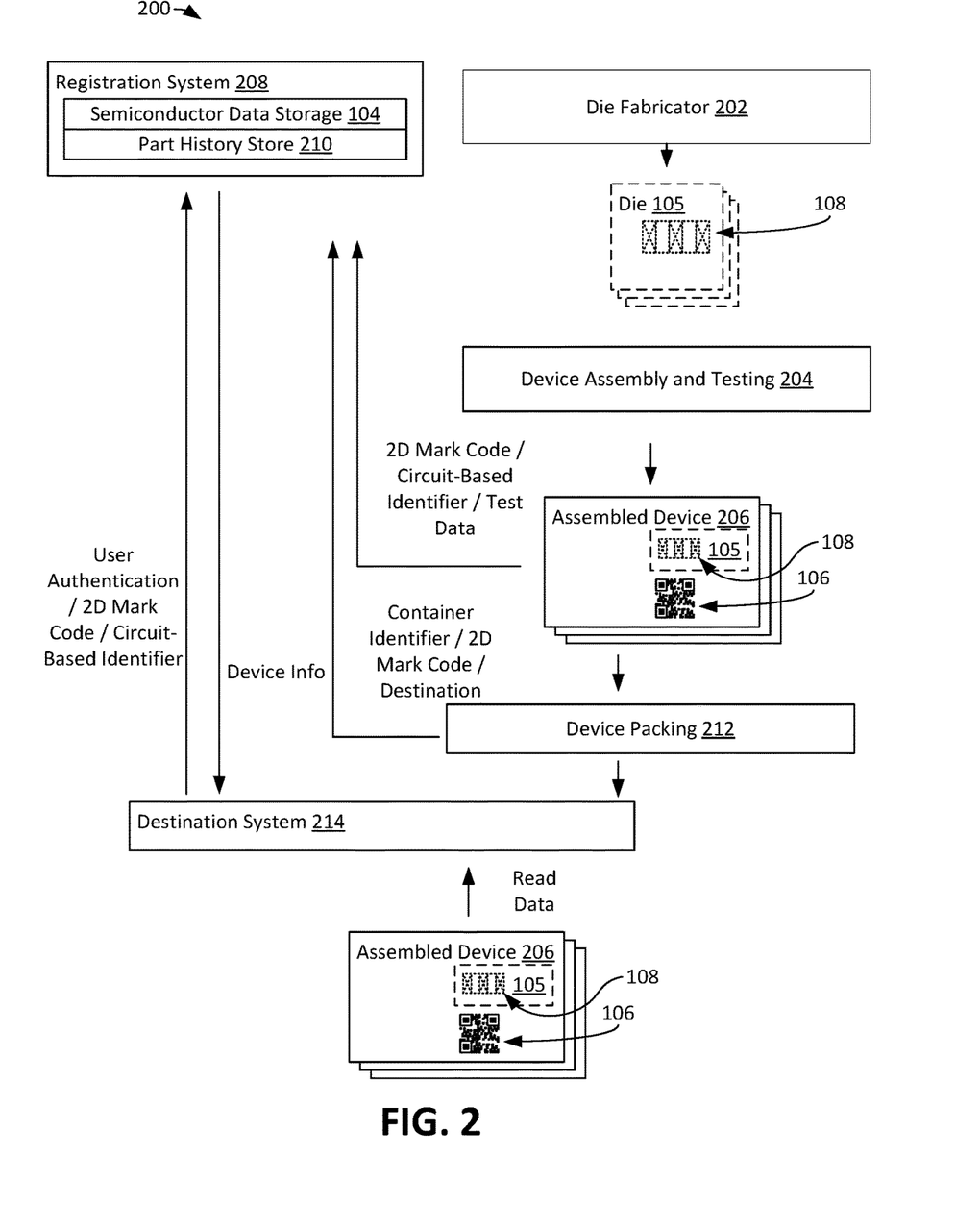
FIG. 2 is a block diagram illustrating product flow for a device having a 2D mark, according to an embodiment.

FIG. 2 is a block diagram illustrating product flow 200 for a device having a 2D mark, according to an embodiment. As shown, a die fabricator 202 manufactures dies 105 with circuit-based identifier 108. A device assembly and testing unit 204 packages the dies to create assembled devices 206 (which are the same as the semiconductor packages 102 of FIG. 1) and marks the assembled devices 206 with 2D marks 106. The device assembly and testing unit 204 tests the dies 105 and transmits the testing data, along with the values represented in the 2D marks 106 and the values represented in the circuit-based identifier 108, to a registration system 208. The registration system 208 comprises a centralized repository that includes the semiconductor data storage 104 described with respect to FIG. 1. The registration system 208 may include one or more computer systems with standard components, such as a processor, memory, storage (such as that used for the semiconductor data storage 104), networking components, and the like, that allow the registration system 208 to accept data from remote computer systems and store the data locally. When the registration system 208 receives the data from the device assembly and testing unit 204, the registration system 208 creates and stores entries as shown in FIG. 1, associating the circuit-based identifier data 109, the 2D mark code 110, and the circuit package data 114. Each of the die fabricator 202, the device assembly and testing unit 204, and the device packing system 212 may comprise one or more types of equipment that are known to perform such functions.

The device packing system 212 packs the assembled devices 206 in to one or more containers. The containers may form a logical hierarchy, with assembled devices 206 fitting into smaller containers, which fit into larger containers. Each such container may have an identifying mark. In various embodiments, the device packing system 212 transmits one or more of the identifying marks for one or more of the containers to the registration system 208 for storage in part history store 210. The device packing system 212 also transmits an intended shipping destination to the registration system 208 for storage in the part history store 210. The part history store 210 stores indications of what container(s) particular 2D mark code(s) are associated with and what the intended destination is for any of those particular containers. The part history store 210 may include one or more storage elements such as hard disks, and the like, functionally coupled to appropriate computer systems. In this manner, the part history store 210 associates 2D mark codes with specific destinations. Because the destinations represent, for example, customers that receive assembled devices 206 for end-use, the part history store 210 allows for tracking of which assembled devices 206 are shipped to which customers.

The part history store 210 also includes an indication of a "user" ("user credentials") to which one or more circuit packages or one or more containers (containing circuit packages) have been shipped. This user indication indicates which user or users are "authorized" to use circuit packages associated with the user credentials in the part history store 210. In one example, one or more circuit packages are associated with a first set of user credentials, meaning that each such circuit package indicated as being authorized for use by the user associated with the first set of user credentials.

The destination system 214 represents one or more computers associated with the organization to which the assembled devices 206 have been shipped. The destination system 214 receives the assembled devices 206 and may request information or services from the registration system 208. To request such services, the destination system 214 provides authentication information associated with the destination system 214, along with the 2D mark code and the circuit-based identifier data, to the registration system 208. The registration system 208 may provide device information and/or services related to the scanned assembled devices 206. In various embodiments, the registration system 208 verifies the 2D mark code/circuit-based identifier combination to determine whether the device is counterfeit, and may also examine the user authentication data to determine whether the entity (i.e., destination system 214) requesting information or services is the entity for which permission for such information or services has been granted. This verification allows for making a determination of whether the entity requesting information for the circuit package is an authorized user. Verifying user credentials against 2D mark codes can help to track or prevent "grey market" sales of circuit packages. More specifically, grey market sales occur when a customer that purchases circuit packages resells those circuit packages in an unauthorized manner. The registration system 208 "knows" about the authorized user and can check to determine that requests for information are coming from such authorized user. If such requests are not coming from authorized user, then registration system 208 "knows" that circuit packages are being resold in an unauthorized manner. The registration system 208 can store data regarding the users from which requests for information have been received, as well as the 2D mark codes for which the requests have been received, thus storing "tracking" data for circuit packages.

Figure 3:
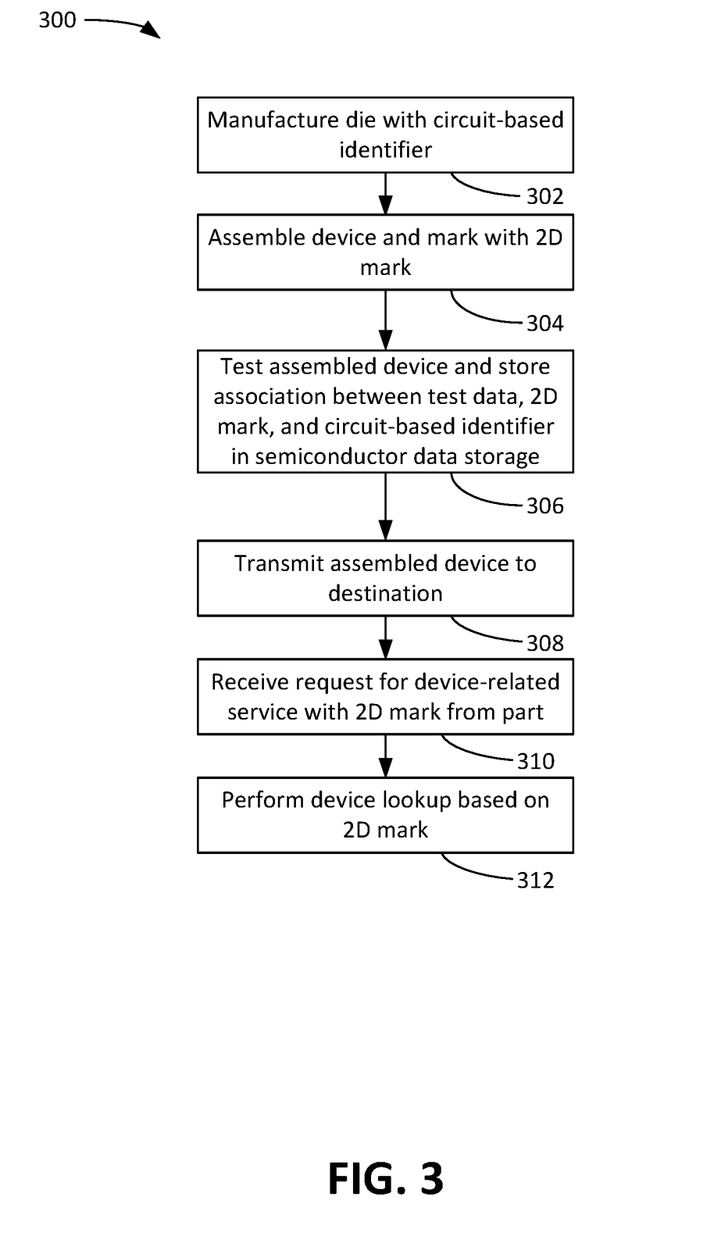
FIG. 3 is a flow diagram of a method for providing part data for an assembled part based on a 2D mark code, according to an example.

FIG. 3 is a flow diagram of a method 300 for providing part data for an assembled part based on a 2D mark code, according to an example. As shown, a method 300 begins at step 302, where a die fabricator 202 manufactures a die with a circuit-based identifier 108 as described with respect to FIGS. 1 and 2. At step 304, a device assembly and testing unit 204 assembles the die into an assembled device 206 and marks the assembled device 206 with a 2D mark 106. At step 306, the device assembly and testing unit 204 tests the assembled devices 206 and records testing data. The device assembly and testing unit 204 stores an association between the testing data, the 2D mark code 110 of the assembled devices 206, and the circuit-based identifier data 109 of the assembled devices 206, in the registration system 208. Subsequently, a device packing system 212 packs the assembled device 206 into one or more containers and ships the one or more containers to a destination system at step 308. At the destination system, the destination system scans the 2D mark 106 and transmits the 2D mark code 110 obtained to the registration system 208. The destination system also requests either or both of information or services for the assembled device 206 at step 310. Information can include performance information and specifications for the assembled device 206. Services can include providing manufacturing history, device performance characteristics, device performance distribution within like populations of similar devices, or other services general to all customers or specific to the particular customer to which the device was shipped. The testing information can include device power usage, power distribution within a given device population, device speed performance and distribution, FPGA block level performance (if the device is an FPGA or otherwise similarly programmable device), SERDES (serializer/deserializer) performance, pin-to-pin performance, and other device attributes. At step 312, the requested information and/or services for the assembled device 206 is looked-up based on the 2D mark code 110.

Figure 4:
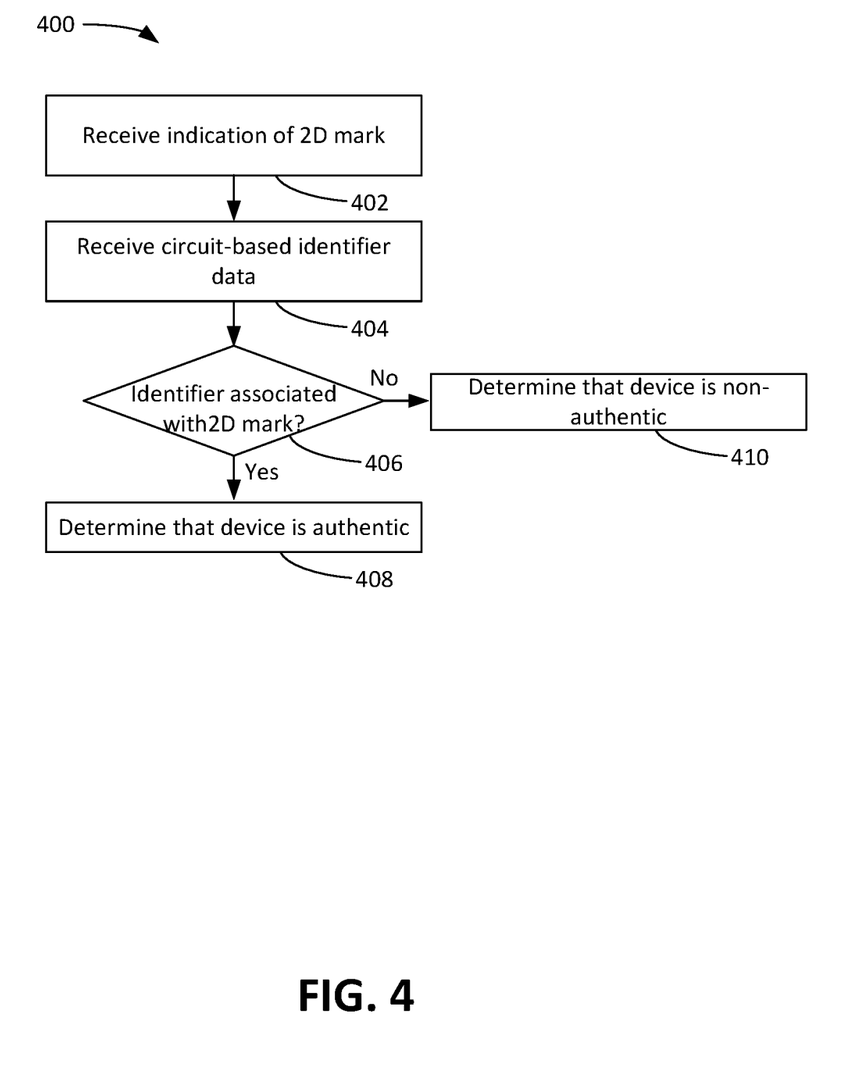
FIG. 4 is a flow diagram of a method for determining whether an assembled part is authentic or counterfeit, according to an example.

FIG. 4 is a flow diagram of a method 400 for determining whether an assembled part is authentic or counterfeit, according to an example. The combination of the 2D mark code 110 and circuit-based identifier data 109 is unique to each assembled device 206. Thus, this combination can be used to determine whether any particular assembled device 206 is authentic or counterfeit. More specifically, a counterfeit manufacturer may mark a counterfeit assembled device with a 2D mark and may include a circuit-based identifier within the counterfeit assembled device. However, the counterfeit manufacturer is extremely unlikely to know the exact combination of those values that is stored in the registration system. A customer that is concerned about whether a particular assembled device is authentic may therefore transmit these values to the registration system 208 for verification as described with respect to the method 400.

As shown, the method 400 begins at step 402, where the registration system 208 receives an indication of a 2D mark (the "2D mark code 110"). At step 404, the registration system 208 receives an indication of the circuit-based identifier 108 (the "circuit-based identifier data 109"). At step 406, the registration system 208 checks the semiconductor data storage 104 to determine whether the circuit-based identifier data 109 received is associated with the 2D mark code 110. If the circuit-based identifier data 109 received is associated with the 2D mark code 110, then the registration system 208 verifies that the assembled devices 206 is authentic at step 408. If the circuit-based identifier data 109 is not associated with the 2D mark code in the registration system 208, then the registration system 208 determines that the assembled devices 206 is not authentic at step 410.

Figure 5:
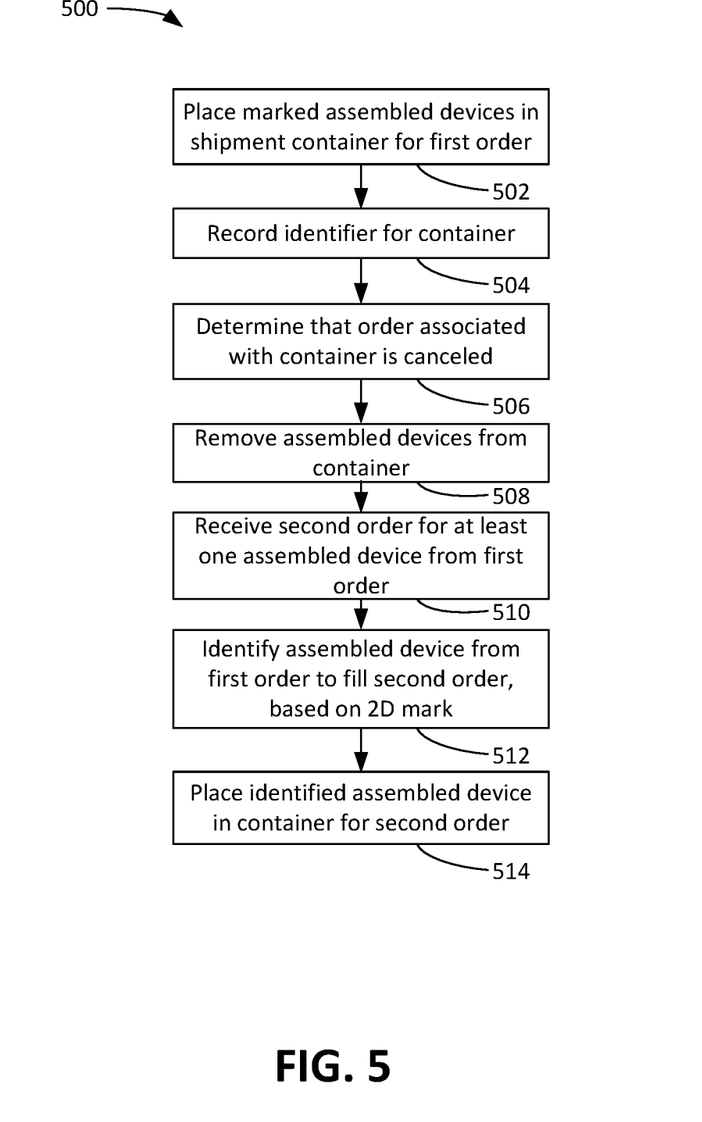
FIG. 5 is a flow diagram of a method for redirecting inventory of assembled devices utilizing 2D marks, according to an embodiment.

FIG. 5 is a flow diagram of a method 500 for redirecting inventory of assembled devices 206 utilizing 2D marks 106, according to an embodiment. Because each assembled device 206 is marked with a unique 2D mark 106, assembled devices 206 can be identified by the 2D mark 106. This identification allows for easy re-direction of assembled devices 206 in certain circumstances. In one example, a customer places an order and then cancels the order. The assembled devices 206 in the canceled order can be easily redirected to other orders based on the 2D marks 106 of the assembled devices 206 of the canceled order.

As shown, a method 500 begins at step 502, where a device packing system 212 places marked assembled devices 206 into one or more shipment containers for a first order. As described above, one or more assembled devices 206 can be placed in one or more packing containers. At step 504, the device packing system 212 records identifiers for the containers into which the assembled devices 206 are placed and stores these identifiers in part history store 210. Part history store 210 records an order number, container identifiers associated with that order number, and 2D mark codes 110 stored within each of the containers. Part history store 210 thus stores which containers each assembled device 206 is stored in. Recording identifiers for the containers allows for tracking of the assembled devices 206 and allows for easy location of assembled devices 206 at various points in time.

At step 506, the device packing system 212 determines that the first order, which is associated with the container discussed with respect to step 504, has been canceled. At step 508, the device packing system 212 removes parts from the container for re-packaging for a subsequent order. At step 510, the device packing system 212 receives a second order for at least one assembled device from the first order. The second order may identify one or more assembled devices 206 based on a qualitative description of assembled devices 206, such as performance data, device capabilities, and/or some other type of qualitative description. At step 512, the device packing system 212 identifies at least one assembled device 206 to fill the second order, where the at least one assembled device 206 was present in the first order. The device packing system 212 may find one or more of the assembled devices 206 for the second order based on the one or more qualitative descriptions received. Finding such assembled devices 206 may be performed by examining the circuit package data 114 of the semiconductor data storage 104 and identifying the 2D code associated with particular specifications. Subsequently, the device packing system 212 retrieves the identified assembled devices 206. At step 514, the device packing system 212 places the identified assembled device(s) 206 in one or more containers for the second order. The device packing system 212 records identifiers for the one or more containers as described above.

Figure 6:
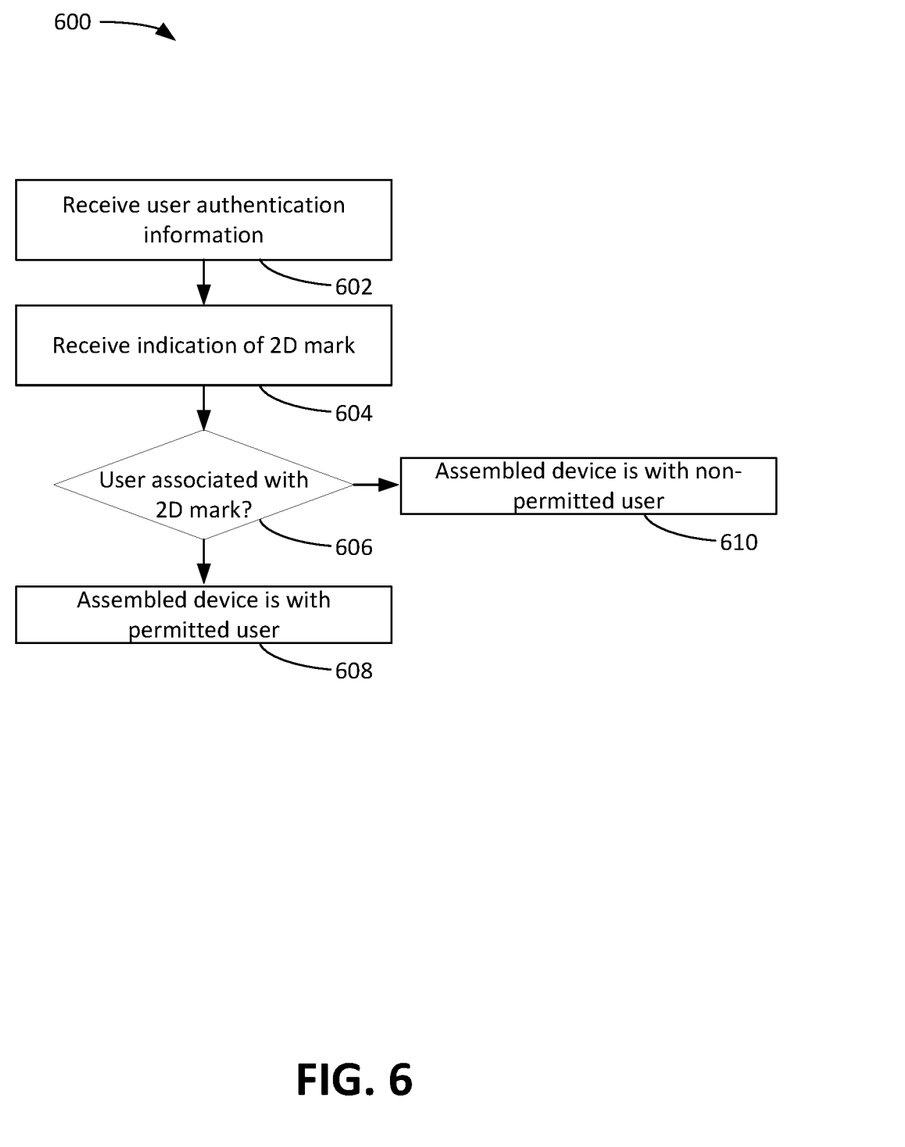
FIG. 6 is a flow diagram of a method for validating requests for information or services for an assembled device, according to an example.

FIG. 6 is a flow diagram of a method 600 for validating requests for information or services for an assembled device 206, according to an example. As shown, the method 600 starts at step 602, where the registration system 208 receives user authentication information. The user authentication information is associated with a specific customer and uniquely identifies the customer. The authentication information may include a user name and password or other authentication information that uniquely identifies a user (such as an organization, an individual, or the like) as is generally known. At step 604, the registration system 208 receives an indication of the 2D mark (the 2D mark code 110). At step 606, the registration system 208 determines whether the part history store 210 indicates that the authentication information is indicated as being associated with the 2D mark code 110. If the authentication information is not associated with the 2D mark code 110, then method 600 proceeds to step 610 and if the authentication information is associated with the 2D mark code 110, then method 600 proceeds to step 608. At step 610, because the authentication information is not associated with the 2D mark code 110, the assembled device is not considered to be with a permitted user. At step 608, because the authentication information is associated with the 2D mark code 110, the assembled device is considered to be with a permitted user, in which case the registration system 208 determines that the user that submitted the user credentials is allowed to obtain information and services for the assembled device 206.

Figure 7:
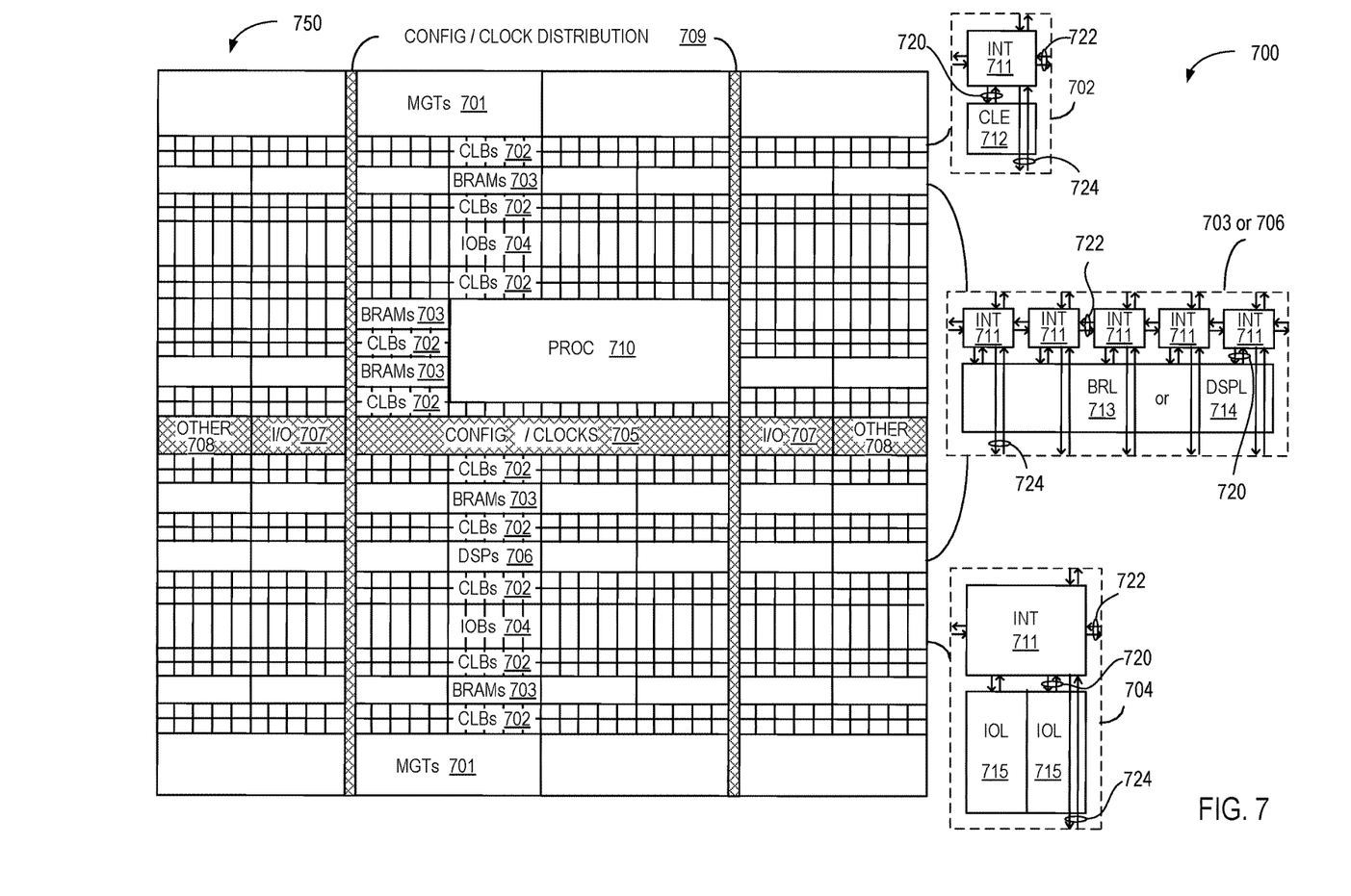
FIG. 7 illustrates an example architecture of a field programmable gate array ("FPGA") that may be one or more of the assembled devices illustrated in FIG. 1, according to an example.

FIG. 7 illustrates an example architecture of a field programmable gate array ("FPGA") 400 that may be one or more of the assembled devices 206 illustrated in FIG. 1, according to an example. The FPGA 700 includes a large number of different programmable tiles in a programmable fabric 750, including multi-gigabit transceivers ("MGTs") 701, configurable logic blocks ("CLBs") 702, random access memory blocks ("BRAMs") 703, input/output blocks ("IOBs") 704, configuration and clocking logic ("CONFIG/CLOCKS") 705, digital signal processing blocks ("DSPs") 706, specialized input/output blocks ("I/O") 707 (e.g., configuration ports and clock ports), and other programmable logic 708, such as digital clock managers, analog-to-digital converters, system monitoring logic, and so forth. Some FPGAs also include dedicated processor blocks ("PROC") 710.

In some FPGAs, each programmable tile can include at least one programmable interconnect element ("INT") 711 having connections to input and output terminals 720 of a programmable logic element within the same tile, as shown by examples included at the top of FIG. 7. Each programmable interconnect element 711 (also referred to as "interconnect element 711") can also include connections to interconnect segments 722 of adjacent programmable interconnect element(s) in the same tile or other tile(s). Each programmable interconnect element 711 can also include connections to interconnect segments 724 of general routing resources between logic blocks (not shown). The general routing resources can include routing channels between logic blocks (not shown) comprising tracks of interconnect segments (e.g., interconnect segments 724) and switch blocks (not shown) for connecting interconnect segments. The interconnect segments of the general routing resources (e.g., interconnect segments 724) can span one or more logic blocks. The programmable interconnect elements 711 taken together with the general routing resources implement a programmable interconnect structure ("programmable interconnect") for the illustrated FPGA. As described further below, in some examples, some or all of the interconnect elements 711 can include additional circuitry for efficient implementation of TCAMs.

In an example implementation, a CLB 702 can include a configurable logic element ("CLE") 712 that can be programmed to implement user logic plus a single programmable interconnect element ("INT") 711. A BRAM 703 can include a BRAM logic element ("BRL") 713 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 706 can include a DSP logic element ("DSPL") 714 in addition to an appropriate number of programmable interconnect elements. An IOB 704 can include, for example, two instances of an input/output logic element ("IOL") 415 in addition to one instance of the programmable interconnect element 711. As will be clear to those of skill in the art, the actual I/O pads connected, for example, to the I/O logic element 715 typically are not confined to the area of the input/output logic element 715.

In the pictured example, a horizontal area near the center of the die (shown in FIG. 7) is used for configuration, clock, and other control logic. Vertical columns 709 extending from this horizontal area or column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic. For example, processor block 710 spans several columns of CLBs and BRAMs. The processor block 710 can include various components ranging from a single microprocessor to a complete programmable processing system of microprocessor(s), memory controllers, peripherals, and the like.

Note that FIG. 7 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 7 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA. In another example, an FPGA can include an entire processing system (e.g., processor, memory, peripherals, etc.) instead of, or in addition to, the processor block 710. In such an implementation, a System-on-Chip (Soc) can include a programmable fabric (programmable logic as shown in FPGA 700) in communication with a processing system.

While the foregoing is directed to specific examples, other and further examples may be devised without departing from the basic scope thereof, and the scope thereof is determined by the claims that follow.

What is claimed is:

1. A method for tracking information for circuit packages, the method comprising:
   identifying a first circuit-based identifier value encoded into a first circuit package of the circuit packages;
   identifying a first mark value for a first mark on a surface of the first circuit package;
   associating the first circuit-based identifier value with the first mark value in a centralized data store to generate a first association;
   receiving a request to obtain information for the first circuit package, the request including a second mark value; and
   comparing the second mark value to the first mark value to obtain the information for the first circuit package.

2. The method of claim 1, wherein:
   the request further includes a second circuit-based identifier value to check against the first circuit-based identifier value.

3. The method of claim 2, further comprising:
   determining whether the first circuit package is counterfeit by determining whether the first association associates the second circuit-based identifier with the second mark value.

4. The method of claim 1, further comprising:
   receiving user credentials; and
   checking the user credentials against user credentials associated with the first mark value in the centralized data store to determine whether the request is received from an authorized user.

5. The method of claim 1, further comprising:
   receiving a request for a circuit package having a set of performance characteristics;
   identifying the first circuit package as having the set of performance characteristics based on first performance data stored in the centralized data store;
   identifying the first mark value as being associated with the first performance data in the centralized data store; and
   locating the first circuit package based on the first mark value.

6. The method of claim 1, wherein:
   the first circuit-based identifier value is encoded within a series of fuses embedded within the first circuit package.

7. The method of claim 1, wherein:
   the first circuit-based identifier value includes an indication of one or more of a wafer number identifying a wafer from which a die included within the first circuit package originated, a lot number identifying a lot that included the wafer, and a die coordinate geometrically identifying the die within the wafer.

8. The method of claim 1, wherein:
   the first mark value is encoded within a 2-dimensional bar code on the first circuit package.

9. The method of claim 1, wherein:
   the first mark value comprises an encrypted version of a value that identifies one or more of a location at which the first circuit package was assembled, a time at which the first package was assembled, and a serial number identifying the first circuit package.

10. A registration system for tracking information for circuit packages, the registration system comprising:
    a storage device; and
    a processor configured to:
      receive a first circuit-based identifier value encoded into a first circuit package of the circuit packages;
      receive a first mark value for a first mark on a surface of the first circuit package;
      associate the first circuit-based identifier value with the first mark value in the storage device to generate a first association;
      receive a request to obtain information for the first circuit package, the request including a second mark value; and
      compare the second mark value to the first mark value to obtain the information for the first circuit package.

11. The registration system of claim 10, wherein:
    the request further includes a second circuit-based identifier value to check against the first circuit-based identifier value.

12. The registration system of claim 11, wherein the processor is further configured to:
    determine whether the first circuit package is counterfeit by determining whether the first association associates the second circuit-based identifier with the second mark value.

13. The registration system of claim 10, wherein the processor is further configured to:
    receive user credentials; and
    check the user credentials against user credentials associated with the first mark value in the storage device to determine whether the request is received from an authorized user.

14. The registration system of claim 10, wherein the processor is further configured to:
    receive a request for a circuit package having a set of performance characteristics;
    identify the first circuit package as having the set of performance characteristics based on first performance data stored in the storage device;
    identify the first mark value as being associated with the first performance data in the storage device; and
    locate the first circuit package based on the first mark value.

15. The registration system of claim 10, wherein:
    the first circuit-based identifier value is encoded within a series of fuses embedded within the first circuit package.

16. The registration system of claim 10, wherein:
    the first circuit-based identifier value includes an indication of one or more of a wafer number identifying a wafer from which a die included within the first circuit package originated, a lot number identifying a lot that included the wafer, and a die coordinate geometrically identifying the die within the wafer.

17. The registration system of claim 10, wherein:
the first mark value is encoded within a 2-dimensional bar code on the first circuit package.

18. The registration system of claim 10, wherein:
the first mark value comprises an encrypted version of a value that identifies one or more of a location at which the first circuit package was assembled, a time at which the first package was assembled, and a serial number identifying the first circuit package.

19. A circuit package, comprising:
an integrated circuit die;
a first circuit-based identifier located within the integrated circuit die and encoding a first circuit-based identifier value;
an encapsulation material encapsulating the integrated circuit die; and
a first mark on a surface of the encapsulation material and encoding a first mark value,
wherein a centralized data store stores an association between the first circuit-based identifier value and the first mark value.

20. The method of claim 19, wherein:
the first circuit-based identifier value is encoded within a series of fuses embedded within the first circuit package;
the first circuit-based identifier value includes an indication of one or more of a wafer number identifying a wafer from which a die included within the first circuit package originated, a lot number identifying a lot that included the wafer, and a die coordinate geometrically identifying the die within the wafer;
the first mark value is encoded within a 2-dimensional bar code on the first circuit package; and
the first mark value comprises an encrypted version of a value that identifies one or more of a location at which the first circuit package was assembled, a time at which the first package was assembled, and a serial number identifying the first circuit package.

\* \* \* \* \*